(12) United States Patent
Chang et al.

(10) Patent No.: US 8,698,056 B2
(45) Date of Patent: Apr. 15, 2014

(54) BATTERY-FREE ELECTROMAGNETIC LEAKAGE DETECTOR

(75) Inventors: Sheng-Fuh Chang, Chiayi County (TW); Chia-Chan Chang, Chiayi County (TW); Po-Yu Tsai, Taichung County (TW)

(73) Assignee: National Chung Cheng University, Chia-Yi (TW)

( * ) Notice: Subject to any disclaimer, the term of this patent is extended or adjusted under 35 U.S.C. 154(b) by 579 days.

(21) Appl. No.: 12/926,723

(22) Filed: Dec. 7, 2010

(65) Prior Publication Data

US 2011/0291011 A1    Dec. 1, 2011

(30) Foreign Application Priority Data

May 27, 2010    (TW) .............................. 99117047 A

(51) Int. Cl.
*H05B 6/76* (2006.01)
*G01T 1/00* (2006.01)
*G01D 21/00* (2006.01)

(52) U.S. Cl.
USPC ...................... 219/737; 250/336.1; 250/474.1

(58) Field of Classification Search
USPC .......... 219/736–743; 320/163, 108–112, 140, 320/150, 180; 73/40, 40.5 R, 49.5, 49.8; 250/336.1, 474.1
See application file for complete search history.

(56) References Cited

U.S. PATENT DOCUMENTS

| 7,921,694 B2 * | 4/2011 | Buhring ..................... 73/40.5 R |
| 2006/0289525 A1 | 12/2006 | Hovorka |
| 2008/0174269 A1 * | 7/2008 | DeRome et al. ............. 320/110 |
| 2010/0194354 A1 * | 8/2010 | Gotou et al. ................. 320/163 |

* cited by examiner

*Primary Examiner* — Quang Van
(74) *Attorney, Agent, or Firm* — Bacon & Thomas, PLLC

(57) ABSTRACT

A battery-free electromagnetic leakage detector includes a substrate, an antenna, a filter circuit electrically connected with the antenna, a clamp circuit electrically connected with the filter circuit, and an indicating member electrically connected with the clamp circuit. Accordingly, the battery-free electromagnetic leakage detector is structurally simple and compact and can detect electromagnetic waves and display the detection without connection with any external power source.

8 Claims, 4 Drawing Sheets

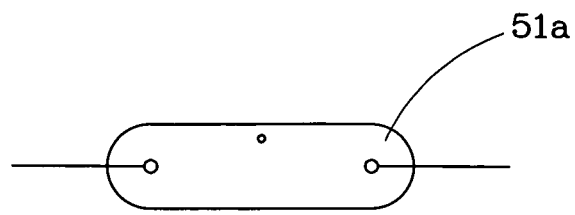
FIG. 4 ( A )
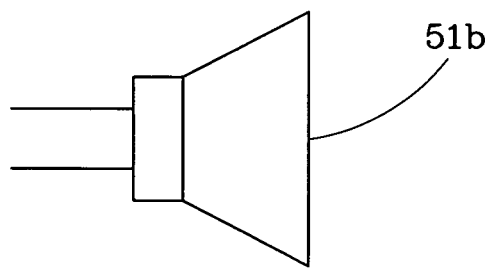
FIG. 4 ( B )
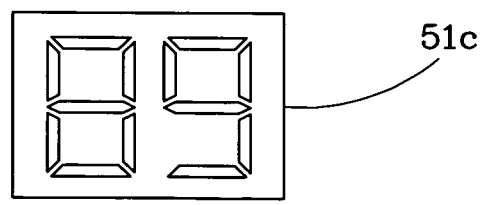
FIG. 4 ( C )

BATTERY-FREE ELECTROMAGNETIC LEAKAGE DETECTOR

BACKGROUND OF THE INVENTION

1. Field of the Invention

The present invention relates generally to an apparatus capable of detecting electromagnetic waves, and more particularly, to a battery-free electromagnetic leakage detector without power supply or battery.

2. Description of the Related Art

As the technology progresses through time, the high-technology products also keep progressing. People in the modern time have become more and more dependent on the high-technology products for convenience and their lives are full of electric/electronic products including high-energy appliances, such as electric stoves, microwave stoves, wireless communication products, etc.

In the daily living environment, the electric appliances are everywhere. However, the currents flowing in the circuit definitely generate electromagnetic waves which may be hazardous to health. Therefore, it is necessary to take precautions for detecting and preventing the electromagnetic waves from leakage. Although active electromagnetic detectors are commercially available for precise detection of the magnitude of the electromagnetic waves, they are expensive and inconveniently portable.

Among the prior art, there are other approaches of detecting the electromagnetic waves, like U.S. Patent Laid-open No. 2006/0289525 entitled "Microwave Leakage Indicator Card", which disclosed that an antenna is employed for receiving the microwave energy and then such microwave energy is converted into thermal energy via a back-end circuit to further change the color of the proposed temperature sensitive color indicator for displaying the detection of the electromagnetic waves. Besides, Taiwanese Patent No. M357,670 disclosed a thin energy-saving security alert discoloring device for electromagnetic waves, in which an antenna resonant circuit detects the electromagnetic waves and converts them into magnetic energy to drive a magnetically discoloring material to discolor for displaying detection of the electromagnetic waves.

SUMMARY OF THE INVENTION

The primary objective of the present invention is to provide a battery-free electromagnetic leakage detector, which can detect electromagnetic waves and display the detection without connection with any external power source.

The secondary objective of the present invention is to provide a battery-free electromagnetic leakage detector, which is structurally simple and compact.

The foregoing objectives of the present invention are attained by the battery-free electromagnetic leakage detector composed of a substrate, an antenna, a filter circuit electrically connected with the antenna, a clamp circuit electrically connected with the filter circuit, and an indicating member electrically connected with the clamp circuit.

BRIEF DESCRIPTION OF THE DRAWINGS

FIGS. 4(A)-4(C) show that indicating members are a color-change indicator, an audio indicator, and a digital display separately.

DETAILED DESCRIPTION OF PREFERRED EMBODIMENTS

Figure 1:
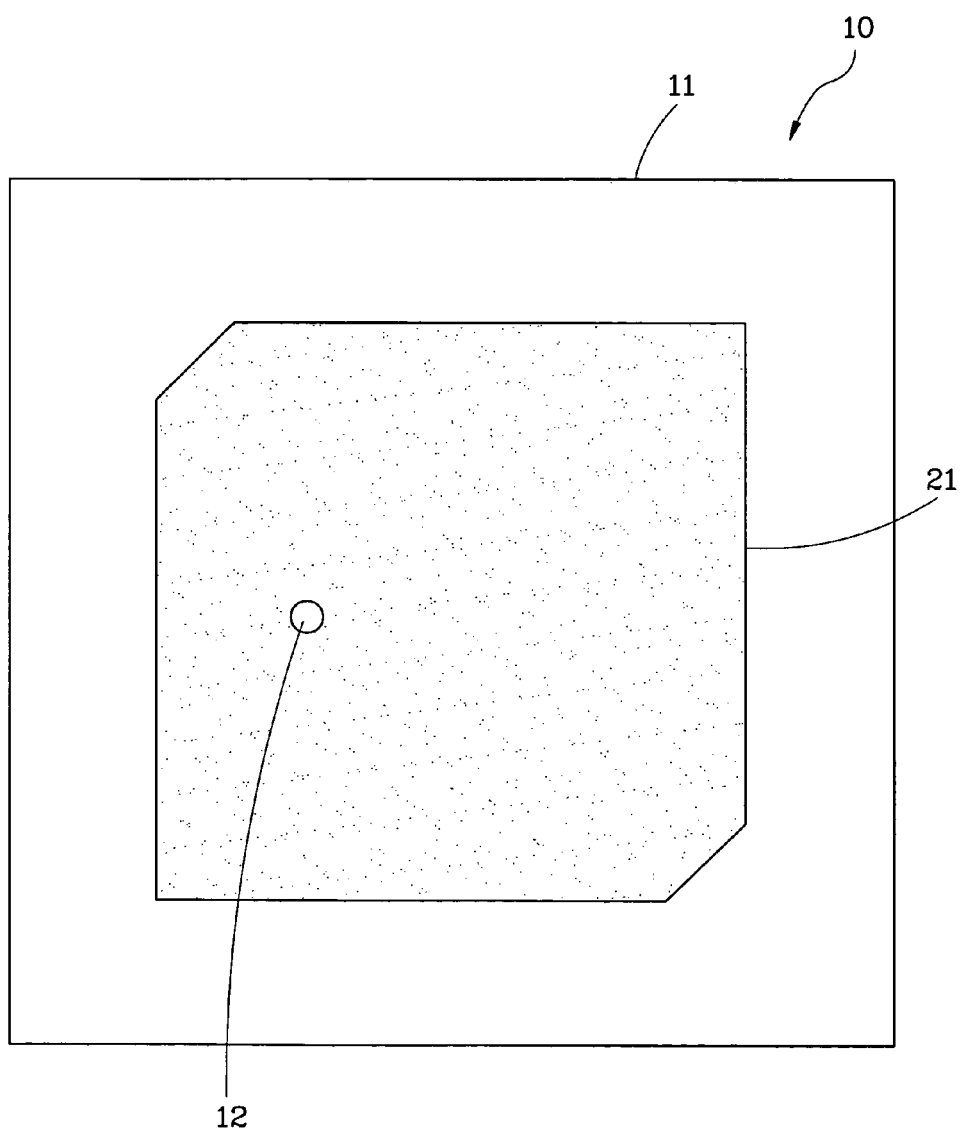
FIG. 1 is a schematic view of a preferred embodiment of the present invention, showing that an antenna is mounted to one side of a substrate.
Figure 2:
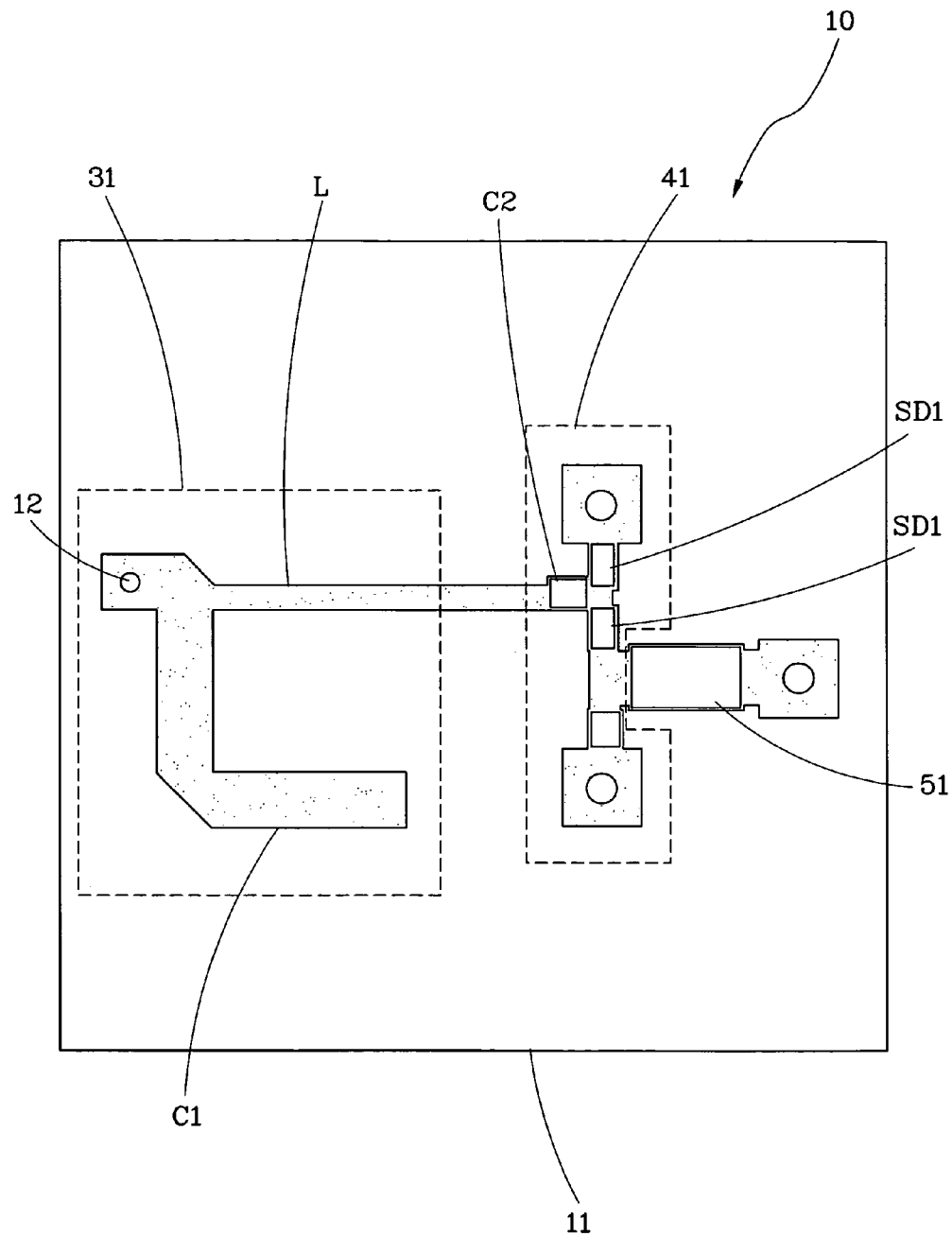
FIG. 2 is another schematic view of the preferred embodiment of the present invention, showing that a filter circuit and a clamp circuit are mounted to the other side of the substrate.
Figure 3:
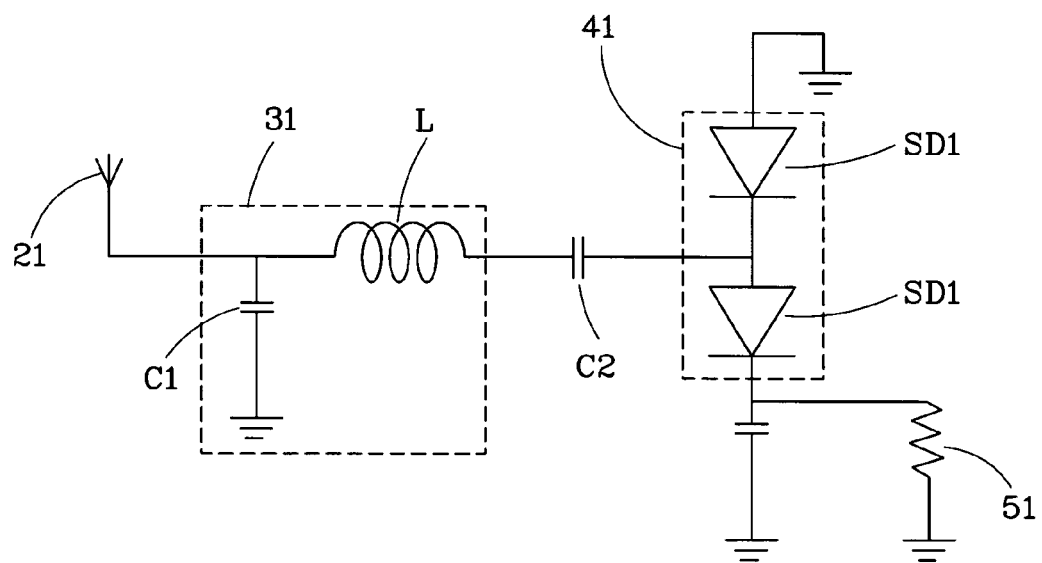
FIG. 3 is a circuit diagram of the preferred embodiment of the present invention.

Referring to FIGS. 1-3, a battery-free electromagnetic leakage detector 10 constructed according to a preferred embodiment of the present invention is composed of a substrate 11, an antenna 21, a filter circuit 31, a clamp circuit 41, and an indicating member 51. The detailed descriptions and operations of these elements as well as their interrelations are recited in the respective paragraphs as follows.

The substrate 11 is a circuit board in this embodiment.

The antenna 21 is a plate-like planar antenna in this embodiment and located on one of two opposite sides of the substrate 11. The filter circuit 31, the clamp circuit 41, and the indicating member 51 are located on the other side of the substrate 11.

The filter circuit 31 is a low pass filter circuit composed of an inductor L and a first capacitor C1. The inductor L is made of an elongated copper foil with a predetermined width. The first capacitor C1 is made of an elongated copper foil having a predetermined width and curved in the shape of an L. At high frequency, the elongated copper foil with the predetermined width can function as an inductor, and the L-shaped elongated copper foil can function as a capacitor. The filter circuit 31 is electrically connected with the antenna 21 via the inductor L. The antenna 21 and the filter circuit 31 which are located on two opposite sides of the substrate 11 are electrically connected with each other via a plated through hole running through the substrate 11.

The clamp circuit 41 is composed of two Schottky diodes SD1 connected in series. The filter circuit 31 is electrically connected with a second capacitor C2 and then the second capacitor C2 is electrically connected with the clamp circuit 41.

The indicating member 51 is a light emitting diode (LED) in this embodiment and is electrically connected with the clamp circuit 41.

It is to be noted that the location of the antenna 21 and the other elements, like the filter circuit 31, are not limited to the opposite two sides of the substrate 11, as an example only, and can alternatively be the same side of the substrate 11.

Similarly, the indicating member 51 is not limited to the LED, as an example only, and can alternatively be a color-change indicator 51a, an audio indicator 51b, or a digital indicator 51c, as shown in FIGS. 4(A) to 4(C), to have the same effect.

Likewise, the filter circuit 31 is not limited to the low pass filter circuit, as an example only, can alternatively be a band pass filter circuit to have the same effect. The inductor L of the filter circuit 31 can alternatively be a chip inductor or a discrete inductor. The first capacitor C1 can alternatively be a chip capacitor or a discrete capacitor. Because the band pass filter circuit, the chip inductor, the discrete inductor, the chip capacitor, and the discrete capacitor belong to the prior art, they are unnecessarily shown in the drawings.

In addition, the antenna 21 is not limited to the planar antenna, as an example only, and can alternatively be a directional antenna, an omnidirectional antenna, a broadband antenna, or any other antenna. Because such antennas belong to the prior art, they are unnecessarily shown in the drawings.

Referring to FIG. 3, when there are electromagnetic waves outside, the antenna 21 can detect and convert their energy into electric energy and then the electric energy can flow to the filter circuit 31; the filter circuit 31 can filter the electric energy out of the sensing coverage thereof. The passed electric energy enhances its voltage level via the clamp circuit 41 and meanwhile is rectified through one of the Schottky diodes SD1 to convert the AC electric energy into the DC one to further drive illumination of the indicating member 51 for security alert. Besides, the clamp circuit 41 operated at high frequency can generate high harmonics which can, by means of the filter circuit 31, reduce the energy loss radiated outside through the antenna 21.

When the intensity of external electromagnetic waves is higher than a predetermined magnitude, the indicating member 51 can illuminate to remind the user that the electromagnetic waves have been higher than certain intensity, thus displaying the detection of the electromagnetic waves.

In addition, the battery-free electromagnetic leakage detector 10 of the present invention does not need any external power source for operation.

Moreover, the elements of the present invention are mounted on two opposite sides of the substrate 11, such that the present invention can be very thin in appearance to facilitate the user to attach it to a surface of a to-be-detected object. Therefore, the present invention includes advantages of simple structure and small size.

Although the present invention has been described with respect to a specific preferred embodiment thereof, it is in no way limited to the specifics of the illustrated structures but changes and modifications may be made within the scope of the appended claims.

What is claimed is:

1. A battery-free electromagnetic leakage detector comprising:
   a substrate;
   an antenna;
   a filter circuit electrically connected with the antenna, wherein the filter circuit is a low pass filter circuit or a band pass filter circuit and composed of an inductor and a first capacitor, the inductor being made of an elongated cooper foil having a predetermined width, the first capacitor being made of an elongated copper foil having a predetermined width and curved in the shape of an L;
   a clamp circuit electrically connected with the filter circuit; and
   an indicating member electrically connected with the clamp circuit.

2. The battery-free electromagnetic leakage detector as defined in claim 1, wherein the indicating member is an LED, a color-change indicator, an audio indicator, or a digital indicator.

3. The battery-free electromagnetic leakage detector as defined in claim 1, wherein the inductor is a chip inductor or a discrete inductor; the first capacitor is a chip capacitor or a discrete capacitor.

4. The battery-free electromagnetic leakage detector as defined in claim 1, wherein the clamp circuit is composed of two semiconductor diodes connected in series.

5. The battery-free electromagnetic leakage detector as defined in claim 1, wherein the filter circuit is electrically connected with a second capacitor and then the second capacitor is electrically connected with the clamp circuit.

6. The battery-free electromagnetic leakage detector as defined in claim 1, wherein the antenna is a directional antenna, an omnidirectional antenna, or a broadband antenna.

7. A battery-free electromagnetic leakage detector comprising:
   a substrate;
   an antenna;
   a filter circuit electrically connected with the antenna;
   a clamp circuit electrically connected with the filter circuit;
   an indicating member electrically connected with the clamp circuit; and
   wherein the antenna is a plate-like planar antenna and located on one of two opposite sides of the substrate; the filter circuit, the clamp circuit, and the indicating member are located on the other side of the substrate and opposite to the antenna.

8. The battery-free electromagnetic leakage detector as defined in claim 7, wherein the antenna and the filter circuit are electrically connected with each other via a plated through hole running through the substrate.

* * * * *